(No Model.)
J. S. LEWIS.
CORN THINNER.
No. 426,028. Patented Apr. 22, 1890.
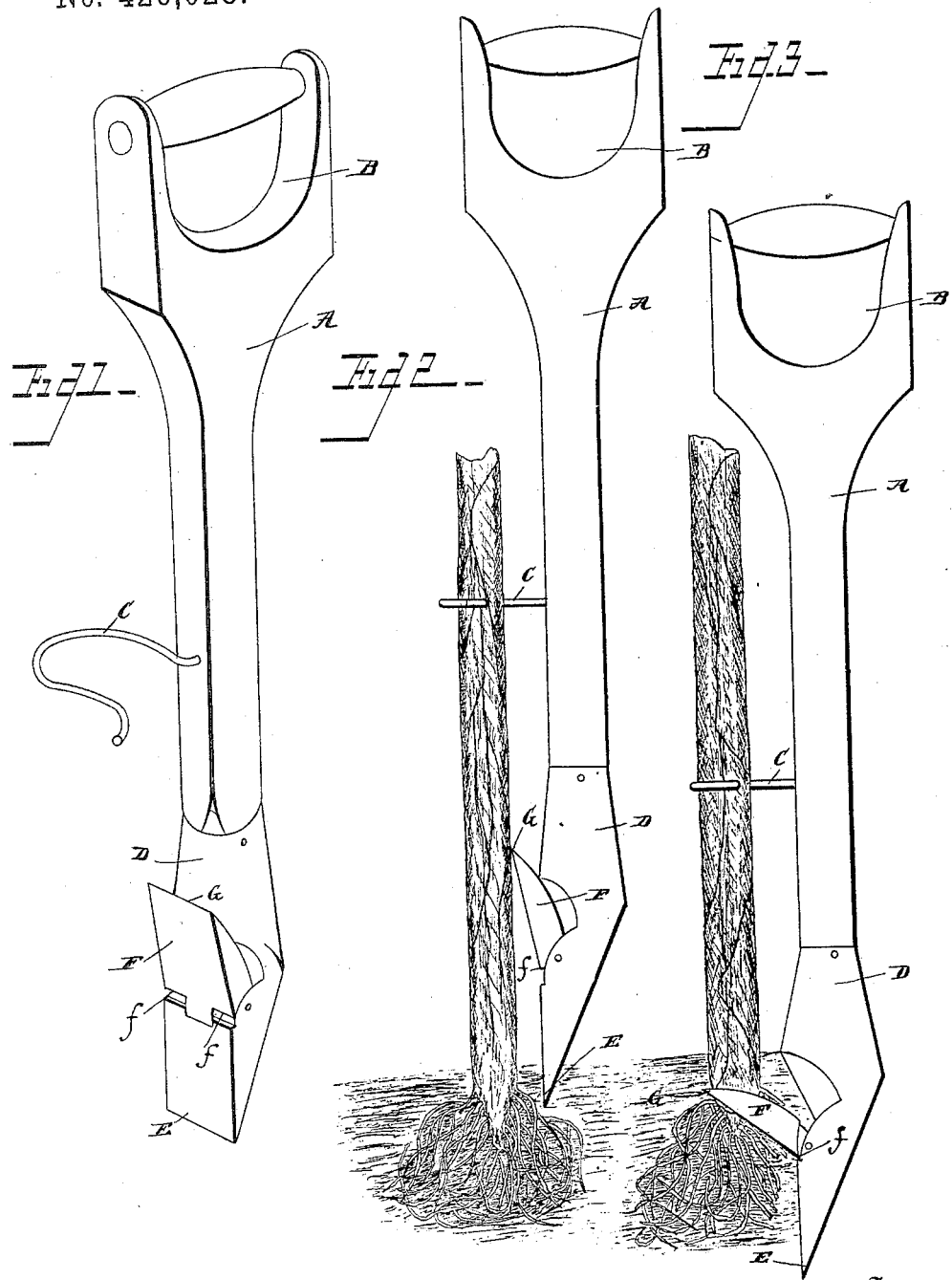
Witnesses
David P. Holhaupter
R. W. Bishop
Inventor
John S. Lewis.
By his Attorneys
C. A. Snow & Co.

UNITED STATES PATENT OFFICE.

JOHN SEAYMOUR LEWIS, OF GRANVILLE, TENNESSEE.

CORN-THINNER.

SPECIFICATION forming part of Letters Patent No. 426,028, dated April 22, 1890.

Application filed October 31, 1889. Serial No. 328,857. (No model.)

*To all whom it may concern:*

Be it known that I, JOHN SEAYMOUR LEWIS, a citizen of the United States, residing at Granville, in the county of Jackson and State of Tennessee, have invented a new and useful Corn-Thinner, of which the following is a specification.

My invention has for its object the provision of a simple and efficient device, by means of which weeds may be easily and effectually removed from a field of corn or the cornstalks uprooted, so as to reduce them to the proper number to secure the necessary growth. This object I accomplish by the use of the device shown in the accompanying drawings; and the invention consists in certain novel features of the same, as will be hereinafter described and claimed.

In the drawings referred to, Figure 1 is a perspective view of my improved device. Fig. 2 is an edge view of the same, showing the manner of inserting it into the ground, and Fig. 3 is a similar view showing its position when being withdrawn.

The handle A of my improved device may be of any desired material and of any desired length, but is preferably of such a length that a person of medium height can use the device without stooping or bending over. The handle is provided at its upper end with a loop B, so that it may be more easily grasped by the hand, and on the side of the handle, near the lower end of the same, I provide the open loop C, which is adapted to pass around the stalk and hold the same in a vertical position when the device is in use. To the lower end of the handle I secure the casting or head D, which is wedge-shaped at its lower end, thereby providing the cutting-edge E, and on the side of this head D, I pivot the tongue F, having the cutting-edge G at its upper end, as shown, and provided with shoulders $f$ for preventing its turning outwardly farther than to the position shown in Fig. 3.

In practice the device is forced downward into the ground close to the stalk, thereby cutting the roots, as shown. When the device has been forced downward to the desired depth, it is raised, thereby causing the cutting-edge of the tongue F to cut the roots until it reaches the steadier and tougher roots, when it will be caused to swing away from the head D under the lower end of the stalk until the shoulder $f$ prevents a farther outward swing, so that the continued upward movement of the device will raise the stalk, with its lower end resting on the tongue F, and remove it from the ground. It will be obvious that by inserting the head D obliquely the roots may be severed by the downward motion thereof without using the tongue F, and also that the latter will operate if the shoulders $f$ are omitted, the stalk being grasped by the hand and lifted thereby after it is cut; but I prefer to insert the head vertically and use the opened tongue with its shoulders to assist in the removal of the stalk. This removal of the stalk will be insured, as the open loop C, passing around the stalk, prevents the same falling away from the device, and consequently it necessarily follows the direction of the tongue and the handle.

My device is very simple, and its advantages are thought to be obvious.

Having thus described my invention, what I claim, and desire to secure by Letters Patent, is—

1. A device for removing plants from the ground, consisting of a handle, a downwardly-facing cutting-head secured to the lower end of the handle, and an open loop on the side of the handle, as set forth.

2. A device for removing plants from the ground, consisting of a handle, a cutting-head secured to the lower end of the handle, a tongue pivoted at its lower end to the said head, and an open loop on the side of the handle, as set forth.

3. A device for removing plants from the ground, consisting of a handle, a downwardly-facing cutting-head secured to the lower end of the handle, a tongue pivoted at its lower end to the said head and having a cutting-edge, as set forth.

4. A device for removing plants from the ground, consisting of a handle, a cutting-head secured to the lower end of the handle, and a knife-edged tongue pivoted at its lower end to said head and having shoulder for limiting its outward movement, for the purpose set forth.

5. A device for removing plants from the ground, consisting of a handle, a laterally-open loop in said handle, a cutting-head secured to the lower end of the handle, and a knife-edged tongue pivoted at its lower end to said head and having shoulders for limiting its outward movement, for the purpose set forth.

In testimony that I claim the foregoing as my own I have hereto affixed my signature in presence of two witnesses.

JOHN SEAYMOUR LEWIS.

Witnesses:
F. A. KELLY,
J. F. MONTGOMERY.